(12) United States Patent
Chigurapati et al.

(10) Patent No.: US 9,703,582 B1
(45) Date of Patent: Jul. 11, 2017

(54) SHARE ACCESS OF ALLOCATED STORAGE SPACE VIA IN-MEMORY FILE SYSTEM BETWEEN VIRTUAL MACHINES

(75) Inventors: Chakravarthi S. Chigurapati, Palo Alto, CA (US); Praveen Madhav, San Jose, CA (US); Sebastian Sapa, Vancouver (CA); Anirban Sinha, Vancouver (CA); Travis Frederick Brown, New Westminister (CA); Duncan Stuart Ritchie, Bowen Island (CA)

(73) Assignee: Tellabs Operations, Inc., Naperville, IL (US)

( * ) Notice: Subject to any disclaimer, the term of this patent is extended or adjusted under 35 U.S.C. 154(b) by 718 days.

(21) Appl. No.: 13/607,218

(22) Filed: Sep. 7, 2012
(Under 37 CFR 1.47)

(51) Int. Cl.
*G06F 9/455* (2006.01)

(52) U.S. Cl.
CPC ...... *G06F 9/45533* (2013.01); *G06F 9/45558* (2013.01); *G06F 2009/45579* (2013.01)

(58) Field of Classification Search
CPC ............... G06F 9/45533; G06F 9/4558; G06F 2009/45579
See application file for complete search history.

(56) References Cited

U.S. PATENT DOCUMENTS

| 6,496,847 | B1* | 12/2002 | Bugnion et al. .................. 718/1 |
| 7,500,048 | B1* | 3/2009 | Venkitachalam ..... G06F 12/109 711/147 |
| 7,539,841 | B2* | 5/2009 | Rawson, III .......... G06F 1/3275 709/205 |
| 7,716,446 | B1* | 5/2010 | Chen ..................... G06F 9/5016 711/170 |
| 7,886,115 | B2* | 2/2011 | Sanvido .............. G06F 9/45558 711/154 |
| 8,627,112 | B2* | 1/2014 | Chaturvedi ............. G06F 21/53 713/193 |
| 8,631,066 | B2* | 1/2014 | Lim ....................... G06F 9/5077 709/203 |
| 8,826,278 | B2* | 9/2014 | Chen ..................... G06F 9/5016 718/1 |
| 8,949,295 | B2* | 2/2015 | McDougall ........... G06F 12/023 707/813 |
| 9,229,757 | B2* | 1/2016 | Ben-Yehuda ....... G06F 12/0802 |

(Continued)

OTHER PUBLICATIONS

Ji Hu, Dirk Cordel and Christoph Meinel; Virtual Machine Management for Tele-Lab "IT-Security" Server; IEEE 2005; 6 pages.*

*Primary Examiner* — Benjamin Wu
(74) *Attorney, Agent, or Firm* — James M. Wu; JW Lawgroup

(57) ABSTRACT

A method or network system able to efficiently redistribute information, data, and/or context between virtual machines ("VMs") using an in-memory file system ("IMFS") is disclosed. After requesting memory access by an application program, a process of VM using IMFS is able to forward the memory allocation request from a VM kernel operating under a VM environment to an emulator. The emulator, which operates between the VM kernel and the hypervisor, again redirects the memory allocation request to the hypervisor for storage allocation. The hypervisor subsequently allocates at least a portion of storage space in the IMFS in accordance with the memory allocation request.

17 Claims, 7 Drawing Sheets

(56) References Cited

U.S. PATENT DOCUMENTS

| | | | |
|---|---|---|---|
| 9,501,394 B2* | 11/2016 | Koh | G06F 12/023 |
| 2009/0019437 A1* | 1/2009 | Feng et al. | 718/1 |
| 2009/0144510 A1* | 6/2009 | Wibling et al. | 711/147 |
| 2010/0217916 A1* | 8/2010 | Gao | G06F 12/109 |
| | | | 711/6 |
| 2010/0250908 A1* | 9/2010 | Amann et al. | 713/1 |
| 2010/0274947 A1* | 10/2010 | Ohta | G06F 9/45558 |
| | | | 711/6 |
| 2010/0306771 A1* | 12/2010 | Kamay | G06F 9/45558 |
| | | | 718/1 |
| 2011/0061045 A1* | 3/2011 | Phillips | G06F 9/45541 |
| | | | 717/173 |
| 2011/0119669 A1* | 5/2011 | McRae | G06F 9/45558 |
| | | | 718/1 |
| 2011/0246767 A1* | 10/2011 | Chaturvedi et al. | 713/164 |
| 2012/0017209 A1* | 1/2012 | Ben-Yehuda | G06F 9/45558 |
| | | | 718/1 |
| 2012/0323552 A1* | 12/2012 | Lau | G06F 9/45504 |
| | | | 703/26 |
| 2013/0326179 A1* | 12/2013 | Tsirkin et al. | 711/163 |
| 2013/0326508 A1* | 12/2013 | Tsirkin | G06F 9/455 |
| | | | 718/1 |

* cited by examiner

SHARE ACCESS OF ALLOCATED STORAGE SPACE VIA IN-MEMORY FILE SYSTEM BETWEEN VIRTUAL MACHINES

FIELD

The exemplary embodiment(s) of the present invention relates to communications network. More specifically, the exemplary embodiment(s) of the present invention relates to virtualization network devices using in-memory file systems and the near-instantaneous transfer of those file systems from one virtual machine to another virtual machine as part of an in-service software upgrade or downgrade process.

BACKGROUND

With rapid growth of information and/or data transfer over a high-speed communication network such as 3G or 4G cellular services, managing and controlling such data transfer become increasingly difficult and complicated. To handle large amount of network traffic, a conventional network layout employs one or more communications networks such as Internet, LAN (local area network), and/or wireless networks having various network devices such as access switches, routers, and bridges to facilitate data delivery from source to destination.

A large number of network communication devices such as switches and routers typically contain one or more processors, microprocessors, central processing units ("CPUs"), network processors ("NPs"), processing engines ("PEs"), and the like. A function of a processor is to execute instruction based on its hardware design as well as loaded or installed software. A problem associated with network devices is that network devices may go down for various reasons, such as, but not limited to, system maintenance, system failures, system overloading, system upgrades, and the like.

A drawback, however, associated with conventional software upgrade or modification on a network device is that it typically requires the device to stop operation and then upgrade its software. After upgrading or reinstalling new software, system or device rebooting is generally required. During system reinstallation and/or reboot, the device typically cannot provide network service whereby rendering network outage. Such network outage relating to a network system or device can negatively affect overall network performance.

To improve network performance, a technique of in-service software upgrade using virtual machines ("VMs") is introduced. For example, while one VM is configured to continue providing normal network services, another VM is upgraded with the new code. A virtual machine ("VM"), by its nature, typically performs well within its own "sandbox" environment. The performance of VM, however, typically degrades when the VM requires communicating with other VMs.

SUMMARY

One embodiment of the present invention discloses a method and/or network router able to efficiently redistribute data and/or context between virtual machines ("VMs") via an in-memory file system ("IMFS"). After requesting memory access by an application program, a process of VM using IMFS is able to forward the memory allocation request from a VM kernel operating under a VM environment to an emulator. The emulator, which operates between the VM kernel and the hypervisor, again redirects the memory allocation request to the hypervisor for storage allocation. The hypervisor subsequently allocates at least a portion of storage space in the IMFS in accordance with the memory allocation request.

In one embodiment of the present invention, a fault-tolerant storage mechanism is used to store program state(s) running in the context of a VM. For example, if a program dies unexpectedly, the state remains accessible upon program restart. Also, if a VM dies unexpectedly, the state remains accessible upon VM restart. In an alternative embodiment, the state of a program can be transferred from one VM to another. For instance, an in-memory file system holding program state is constructed in the context of one VM. In one aspect, such in-memory file systems are allowed to be transferred to another VM, thereby "virtualizing" that file system. It should be noted that the virtualization is accomplished by propagating the file system metadata (such as inode information and memory mappings) into the hypervisor and allowing the second VM to reconstruct the file system from the hypervisor on an on-demand basis.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
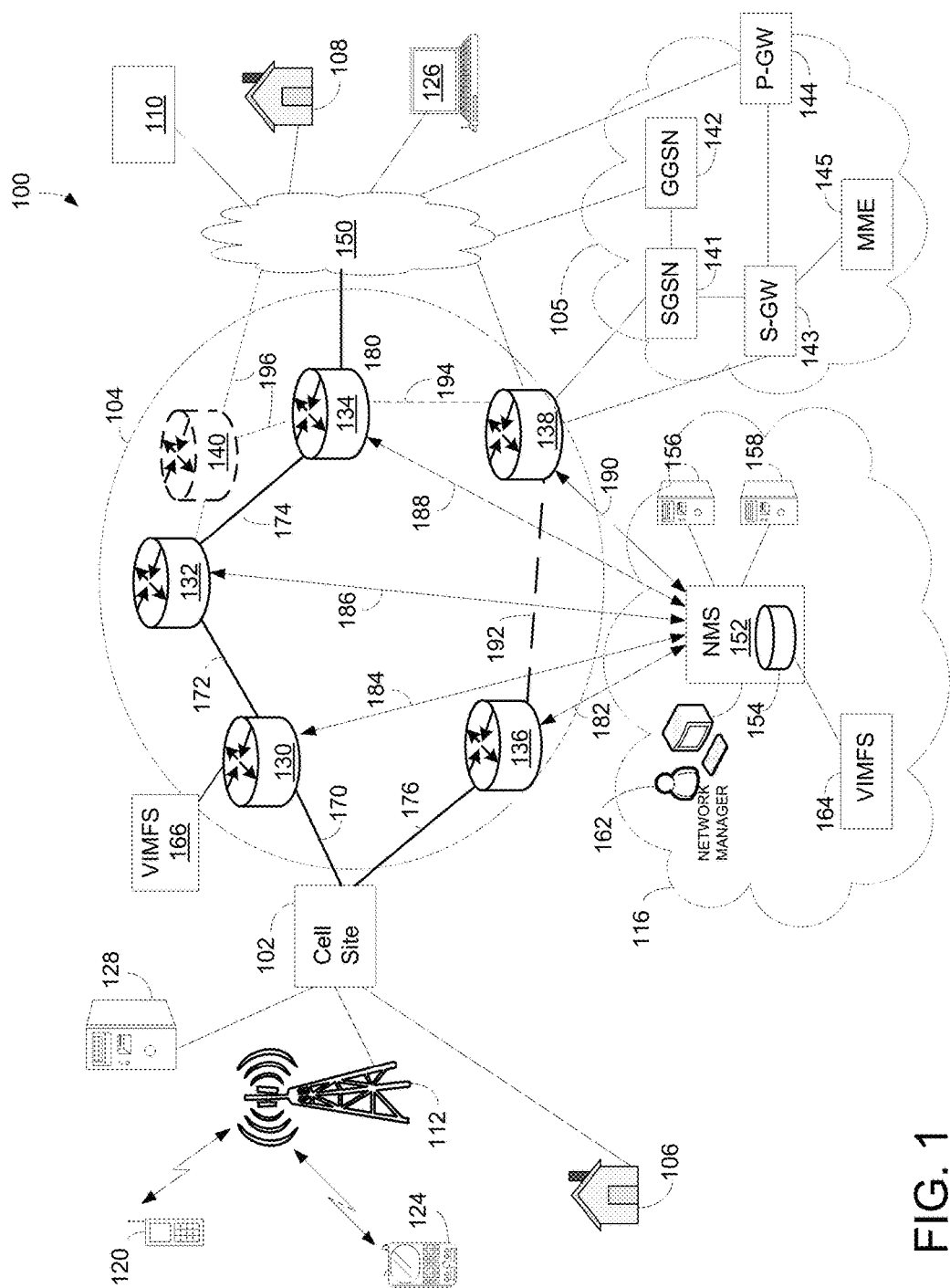
FIG. 1 is a block diagram illustrating a network configuration having network nodes able to perform an in-service software upgrade using in-memory file system ("IMFS") in a virtual machine ("VM") environment in accordance with one embodiment of the present invention.

Exemplary embodiment(s) of the present invention is described herein in the context of a method, device, and/or apparatus using system virtualization with in-memory file system to improve overall network performance.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

One embodiment of the presently claimed invention discloses a network device or node having one or more routers and/or switches able to redistribute information, system states, and/or context between virtual machines ("VMs") via information or data stored in a virtualized in-memory file system ("VIMFS"). To implement data transfer between VMs, the VIMFS manages and facilitates memory allocation via hypervisor. For example, VIMFS is able to pass the memory allocation request from kernel to emulator upon receipt of the request from an application program. The memory allocation request is again forwarded from the emulator to the hypervisor for storage allocation. The hypervisor subsequently allocates at least a portion of storage space in the actual IMFS in hypervisor in accordance with the memory allocation request.

FIG. 1 is a block diagram illustrating a network configuration having network nodes able to enhance network performance using the VIMFS in a VM environment in accordance with one embodiment of the present invention. Diagram 100 includes a cell site 102, a switching network 104, a central office ("CO") 116, and Internet 150. Internet 150 is further coupled with a user 108, a content provider 110 such as a website, and a wireless computer 126. CO 116 provides various network managements including system virtualization and software updates to various network devices. In one embodiment, CO 116 and/or network devices in network 104 employ a VIMFS such as VIMFS 164-166. VIMFS 164 or 166, which can reside in any devices in network 104, is able to facilitate and provide nearly instantaneous data transfer of IMFS from one VM to another, without substantial performance penalty, data loss, size restrictions, and/or marshaling. It should be noted that the underlying concept of the exemplary embodiment(s) of the present invention would not change if one or more blocks (or devices) were added to or removed from diagram 100.

Cell site 102 is used to communicate with mobile devices such as cellular phone 120 and handheld device 124 via radio or cell tower 112. It should be noted that cell site 102 may include additional radio towers as well as other land based switching circuitry. Cell site 102, which is also known as base station and/or cell station, can be configured to support wireless communications as well as wired communications. For example, network communication between users such as nodes 106-108 is managed and facilitated via CO 116, switching network 104, Internet 150, and cell site 102.

Switching network 104 receives and/or routes information, such as packet streams and packet flows between users and/or providers connected to the network. Network 104 includes communication devices or network elements ("NEs") 130-140 which are also known as nodes, switches, bridges, and/or routers. A node, as a logical network entity, is able to manage one or more physical network devices. The physical network devices include routers, modems, hubs, bridges, servers, switches, et cetera. NEs 130-140 are interconnected via connections 170-176 and are used for routing information and/or data packets to and from network clients and/or hosts. Network client in one example may include one or more routers, switches, hosts, users, base stations, and the like. For example, switching network 104 uses NEs 130-134 to route a packet stream from users 106 to 108 via cell site 102 and Internet 150.

NEs 130-140, in one aspect, can be routers, switches, bridges, or a combination of routers, switches, and bridges. The total number of NEs used in switching network 104 may increase or decrease over time depending on the demand of network services. For example, with increasing demand of video streaming, the number of NEs as illustrated in diagram 100 can grow to meet such demand. One aspect of network growth is to add additional NEs into an existing pool of NEs to expand processing and/or service capacity. For instance, NE 140 is recently added to the pool of NEs 130-136 for enhancing routing or processing capacities. The number of NEs can grow into hundreds or thousands depending on the network service demand. Dotted lines 192-196 illustrate connecting lines that recently added or will be added.

Referring back to FIG. 1, diagram 100 further includes an evolved packet core ("EPC") network 105 including various network nodes, such as SGSN 141, GGSN 142, S-GW 143, P-GW 144, and MME 145. EPC network 105 can be implemented in network 104 or a portion of EPC network 105 is implemented in network 104. The traffic, in one example, can also be routed through EPC network to reach Internet 150.

SGSN (serving GPRS (general packet radio service) support node) 141 is configured to authenticate portable wireless user equipments, registering mobile devices, collecting network usage information for billing, et cetera. While SGSN 141 tracks and/or controls mobile communication, GGSN (gateway GPRS support node) 142 inspects and routes information and/or packet traffic between mobile terminal(s) and intended destination(s). MME (mobility management entity) 142, in one aspect, is used to facilitate data transfer between 3G and LTE or between 2G and LTE (or 4G). In LTE (or 4G) network environment, MME 142 performs various controlling/managing functions, such as UE (user equipment) idle mode for tracking, paging, and retransmitting activities. MME 142 also provides network security management as well as resource allocations. S-GW (service gateway) 143 and P-GW (PDN gateway) 144 are responsible for transporting packets between mobiles and destinations via one or more networks such as Internet and LAN.

During an exemplary operation, when user 106 sends a packet to user 108, the packet travels from cell site 102 to routers 130-134 via connections 170-174. After the packet enters Internet 150 via connection 180, it is subsequently received by user 108. To route and facilitate data traffic efficiently, NEs 130-140 in switching network 104 are required to be managed and monitored. To monitor network performance, CO 116, in one embodiment, deploys a network management system ("NMS") 152 or other performance monitoring system to monitor status of switching network 104 based on statistics generated by NEs.

NEs 130-140 and network nodes 141-145 are communication devices containing one or more processors such as CPU(s) and/or NP(s). Some of NEs 130-140 and/or nodes 141-145 may be formed as processing cards and/or line cards arranged or housed in a chassis having multiple slots for housing various cards. In one aspect, NEs 130-140 and/or network nodes 141-145 are managed or controlled by CO 116. CO 116 includes NMS 152, computers or servers 156-158, and network administrator 162. NMS 152, in one example, manages network traffic by monitoring and managing every communication device.

To provide software upgrade/downgrade while the system is in service, NEs 130-140 and/or network nodes 141-145, in one embodiment, are virtualized. For example, NE 130 or NMS 152 includes VIMFS 164 or 166. VIMFS 164 or 166 is configured to manage and allocate memory via IMFS for VMs whereby data copying and context switching are reduced after memory mapping is established.

A virtualized network device such a device having VIMFS 166 is able to reduce service degradation and service unavailability during system maintenance such as software upgrades. For instance, to achieve in-service upgrade/downgrade to a targeted version of code, program or system states (or status) stored or recorded in checkpoint, for example, are passed to the new VM when the execution control is transferred to new version of code.

VIMFS 166 or 164 is able to transfer from a VM to another VM instantaneously without substantial performance penalty or data loss. A benefit of using VIMFS is to provide a fault-tolerant storage mechanism for maintaining and recovering data, such as program states, checkpoints, VM contexts, and the like. For example, if a program dies unexpectedly, the state remains accessible upon program restarts or recovers. Also, if a VM dies, the state remains accessible upon VM recovers or restarts.

VIMFS is capable of transferring VM execution state(s) to another VM via IMFS. Note that the IMFS resides at hypervisor level and is able to hold program state and/or VM context after the program or VM dies. It should be noted that such file system or IMFS is accessible and alive in the context of VM. In one example, IMFS may be established with file system technology such as ramfs (RAM file system) or tmpfs (temporary file system). It should be noted that the virtualization is accomplished by propagating the file system metadata (such as inode information and memory mappings) into the hypervisor and allowing the second VM to reconstruct the file system from the hypervisor on an on-demand basis.

An advantage of using VIMFS is that it is backward compatible with existing program code as well as such storage virtualization can be expanded and/or reduced dynamically based on needs.

Figure 2:
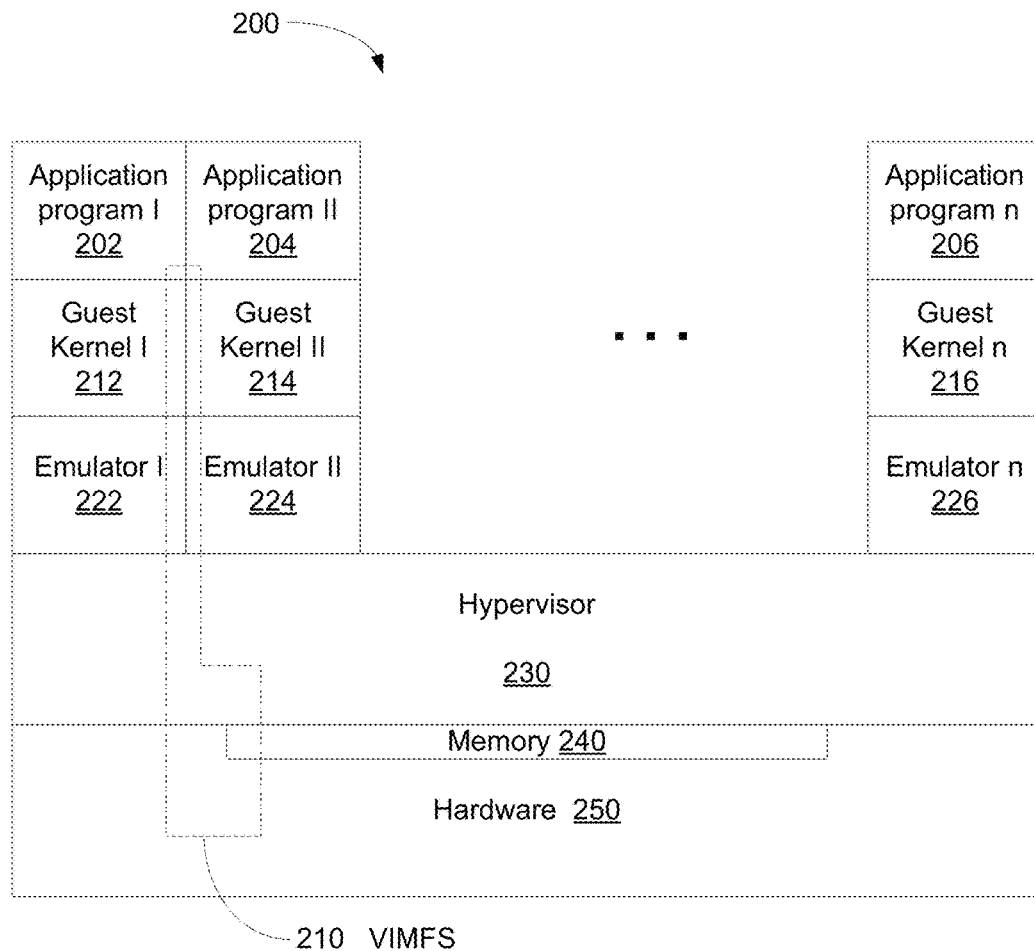
FIG. 2 is a block diagram illustrating an exemplary VM network device employing a virtualized in-memory file system ("VIMFS") in accordance with one embodiment of the present invention.

FIG. 2 is a block diagram illustrating an exemplary VM network device 200 employing a VIMFS in accordance with one embodiment of the present invention. Device 200 includes a hardware layer 250, a hypervisor layer 230, emulators 222-226, VM kernels 212-216, and application programs 202-206 which reside on the top of the VM kernels. To provide a VM environment, device 200, in one embodiment, employs a VIMFS 210 and IMFS, not shown in FIG. 2, to control, redistribute, and access the finite hardware resource such as memory capacity. It should be noted that the underlying concept of the exemplary embodiment(s) of the present invention would not change if one or more layers (or sub-layers) were added to or removed from diagram 200.

Hardware layer 250 includes hardware resources and/or circuitry, such as memory(s) 240, microprocessor(s), registers, power circuitry, buses, and the like. Hardware layer 250 is configured to provide a VM environment allowing multiple virtual machines running concurrently with each virtual machine running multiple processes. Memory(s) or memory sub-layer 240, in one aspect, is organized in file systems capable of implementing IMFS wherein some data such as program execution states or VM context can be retained or maintained after programs or VMs are unexpectedly terminated.

A file system or memory file system is a data structure containing digital information that can be stored, retrieved, and/or updated. Depending on the applications, a file system can be configured to survive the termination of the program or process that creates the file system. Some file systems allow multiple programs to update the same file at nearly the same time. A memory-mapped file, in a VM environment, is a storage space correlation between local VM files and physical storage on a chip or a disk. After memory allocation, the correlation between the file and memory space allows application programs to access the mapped memory as their primary local memories.

Hypervisor 230, which may also be referred to as an abstraction layer of VM manager or virtualization layer, is a software or firmware entity that controls access to the underlying hardware and provides an abstraction layer for multiple virtual machine emulators to co-exist and one in-memory file storage location. In one aspect, VIMFS 210 is at least a part of hypervisor 230 configured to create persistent storage areas for VMs. For example, hypervisor 230 is able to present allocated storage location in IMFS or memory to an application program as its local memory and allows it to access a memory-mapped filed system. Hypervisor 230 maintains program execution state in IMFS for a predefined period of time after the application program terminates or dies. Alternatively, hypervisor 230 can be configured to maintain VM context for a predefined period of time after the associated emulator is down or crashes. Hypervisor 230 can also transfer states and/or context of a first VM in the IMFS to a second VM for certain system operations such as in-service software upgrade.

Emulators 222-226, in one aspect, are software entities residing and running on top of hypervisor 230 and provide VM environment(s) for various virtual guests. Emulators, for example, are able to emulate independent systems capable of supporting operating systems or VM kernels running concurrently. Each emulator, in one embodiment, further includes a request redirect module ("RRM") which is used to forward any storage or memory location request from a VM kernel such as VM kernel 212 to hypervisor 230.

Kernels 212-216, also known as VM kernels, may be viewed as operating systems running within VMs operable to interface between application programs 202-206 and hardware layer 250. A function of kernel includes allocating or distributing system's resources such as memory allocations. It should be noted that different operating systems may require different kernels depending on the operating systems' requirements and applications.

Kernels or VM kernels 212-216, in one aspect, are configured to run over emulators 222-224 for managing system and/or router resources using IMFS for VMs. Each of VM kernels 212-216, for example, includes a virtual file system ("VFS") module used to redirect a storage request from an application program to one of the emulators. It should be noted that RRMs or VFS modules may be part of VIMFS 210.

Applications 202-206, also known as application programs, programmers, and/or users, are configured to run within control of VM kernels 212-214, and are able to access the in-memory file storage. Application programs 202-206 provide various networking related operations, such as routing, switching, resourcing management, billing, metering, packet traffic monitoring, and the like. Application programs 202-206 may also include administrators, network managers, and/or network providers. VIMFS 210, in one aspect, assists hypervisor to dynamically allocate and map local application memories to physical storages via IMFS in a VM environment.

An advantage of employing VIMFS 210 in accordance with one embodiment of the invention is that it reduces data copying and context switching. Once the memory mappings are set, application programs can access the storage location directly and effectively with minimal overheads.

Another advantage of using VIMFS 210 over a conventional fixed-sized shared memory model is that it reduces or eliminates predetermined dedicated fixed size persistent storage allocation for each VM. Note that fixed-sized shared memory model is a memory allocation scheme that a fixed amount of memory space is automatically allocated to each VM regardless of its application(s). VIMFS, in one aspect, is able to dynamically allocate storage memory as needed using IMFS, and de-allocate the storage memory when the storage memory is no longer needed. In one example, the existing memory-mapped file to a storage memory is preserved whereby no additional management and/or synchronization techniques are needed.

Figure 3:
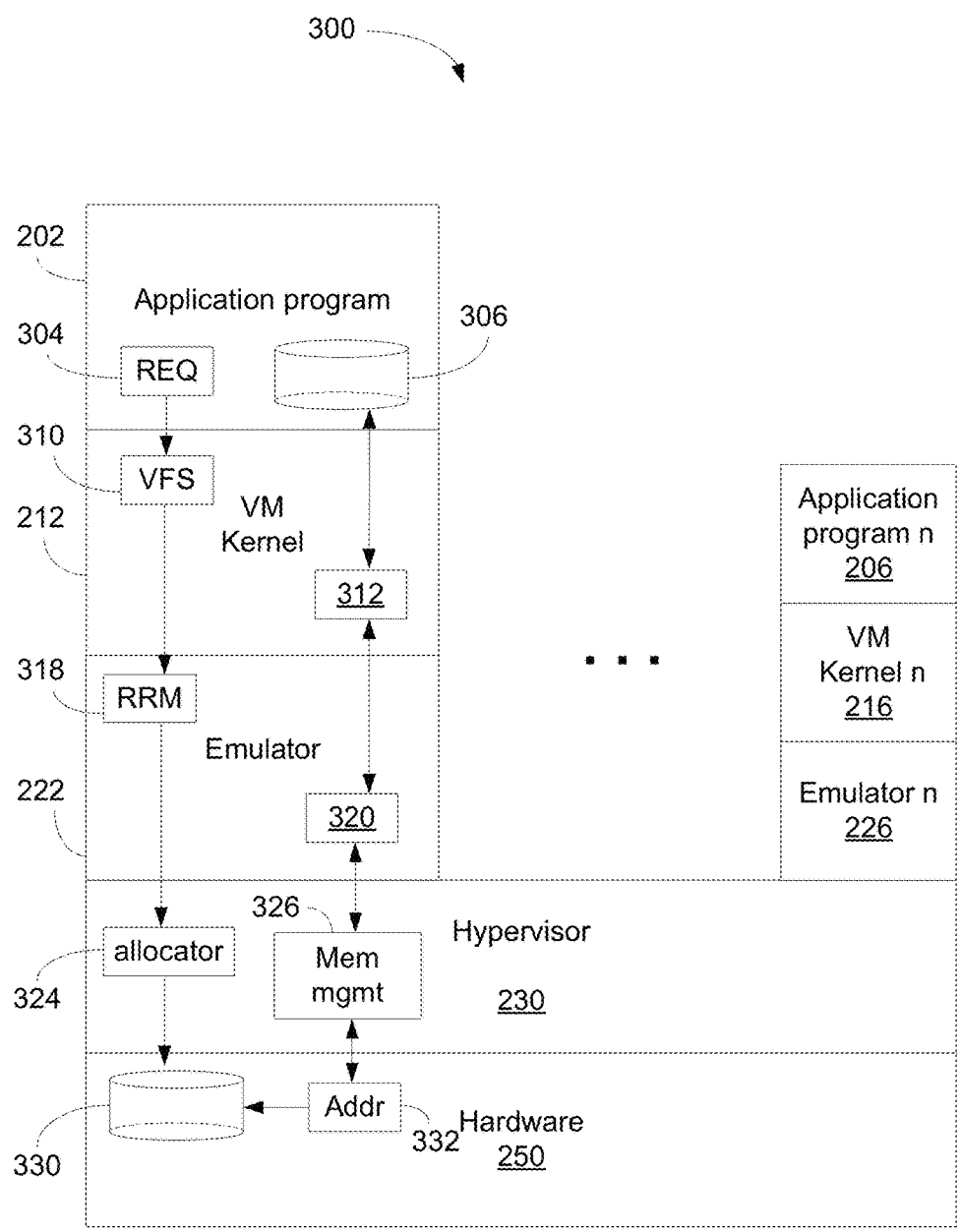
FIG. 3 is a block diagram illustrating a VM network device using VIMFS and IMFS in accordance with one embodiment of the present invention.

FIG. 3 is a block diagram illustrating a VM network device 300 using VIMFS and IMFS in accordance with one embodiment of the present invention. Device 300, which is similar to device 200 as illustrated in FIG. 2, includes a hardware layer 250, a hypervisor layer 230, emulators 222-226, VM kernels 212-216, and application programs 202-206. While application program 202-206 run on the top of VM kernels 212-216, VM kernels 212-216 are supported and facilitated by emulators 222-226. To provide a VM environment, device 300, in one embodiment, employs a VIMFS to control, redistribute, and access the finite hardware resource such as persistent memory storage. It should be noted that the underlying concept of the exemplary embodiment(s) of the present invention would not change if one or more layers (or sub-layers) were added to or removed from diagram 300.

Application program 202, in one embodiment, is running on top of VM kernel 212, and VM kernel 212 is supported by or running on top of emulator 222. Emulator 222 is further supported by hypervisor layer 230 which could also be viewed as an abstraction layer over hardware layer 250 for VMs. Upon activating application program 202, an application memory request 304 is generated by application program 202, and is subsequently forwarded to VM kernel 212. When request 304 arrives at VM kernel 212, VFS module 310 receives and processes request 304, and redirects it to emulator 222. After arriving at emulator 222, RRM 318 again forwards request 304 to hypervisor 230. Once reaching to hypervisor 230, allocator 324 of hypervisor 230 allocates a portion of physical memory 330 in hardware layer 250 in response to request 304 as a dedicated memory space for application program 202. It should be noted that the size or capacity of memory 330 may be dynamically adjustable depending on the applications.

Physical memory 330, in one aspect, can be a memory file organized in IMFS and is addressed or referenced by address 332. When memory manager 326 in hypervisor 230 receives address 332 associated with request 304, memory manager 326 sends address 332 to emulator 222 which records address 332 at emulator memory storage 320 before forwarding it to VM kernel 212. After storing or saving address 332 at kernel memory storage 312, address 332 is again sent to application program 202. Once address 332 arrives at application program 202, local application memory 306 which is mapped to physical memory 330 pointed by address 332 becomes visible and accessible to application program 202.

The process of allocating and mapping a local memory to physical memory under a virtualization environment using IMFS, in one example, can be managed and controlled by VIMFS. It should be noted that VIMFS may be situated in hypervisor, hardware, emulator, kernel, or a combination of hardware hypervisor, emulator, kernel, and application. Furthermore, VIMFS may be implemented by software, hardware, firmware, or a combination of software, hardware, and firmware.

During an operation, device 300 which can be a router or switch can be started by activating hypervisor 230. Hypervisor 230 creates a persistent storage area using an existing, unmodified, memory backed file system. For example, memory allocation commend(s) such as Linux® tmpfs or ramfs can be used to allocate memory space for file system (s). In-memory file storage can be made available to an application program in a way that it hides the fact that the storage resides in the hypervisor. To the application, the storage appears as if it is local and thus can access it using the standard memory-mapped file system technique. To accomplish this transparency, VIMFS manages and instructs both VM kernel 212 and emulator 222 to redirect all memory requests through hypervisor 230.

At VM kernel 212, a virtual file system (VFS) module which may also be called vramfs is established. The VFS module, for example, can be implemented via Linux® command(s). When the VM kernel operates, it configures the vramfs module to advertise storage at a certain location within the local file system hierarchy. It should be noted that the vramfs module redirects storage requests from application programs to RRM in emulator instead of directly allocating the storage. RRM is configured to further redirect the storage request to hypervisor 230. Hypervisor 230 subsequently executes the storage request and returns the appropriate result codes such as address 332 back to emulator 222. Emulator 222 then passes the result codes to the vramfs module in VM kernel 212. Finally, the vramfs module will pass the result codes to the originating application program.

Most of the file system storage access commands are handled via this redirection mechanism managed by VIMFS. However, some special system commands such as mmap( ) may be handled differently. It should be noted that mmap( ) is an existing system command provided by the kernel whose purpose is to make a data entity visible through virtual memory. When the data entity becomes visible, the processor can access the data directly rather than using explicit (and/or expensive) input/output commands through the kernel. Note that memory mapping allows the kernel to store data into its local memory and then memory maps to a physical memory location which is still visible to the application.

For example, mmap( ) may be initiated by an application program requesting local memory or visible memory in the in-memory file storage. Since memory allocation is executed by hypervisor 230, the application memory is not immediately visible to a VM kernel such as VM kernel 212. As such, the mmap( ) is redirected to emulator 222 and emulator 222 further redirects the mmap( ) to hypervisor 230. Hypervisor 230 is configured to map the requested in-memory file storage into emulator 222. Emulator 222 subsequently takes the newly visible memory and attaches it to the running VM. Control is then passed back to the VM kernel vramfs module, wherein the newly attached memory is inserted into the VM kernel with the requested application memory mappings. Finally, the control returns to the application and the resulting memory address can be used to directly access the in-memory storage located in hypervisor 230.

Figure 4:
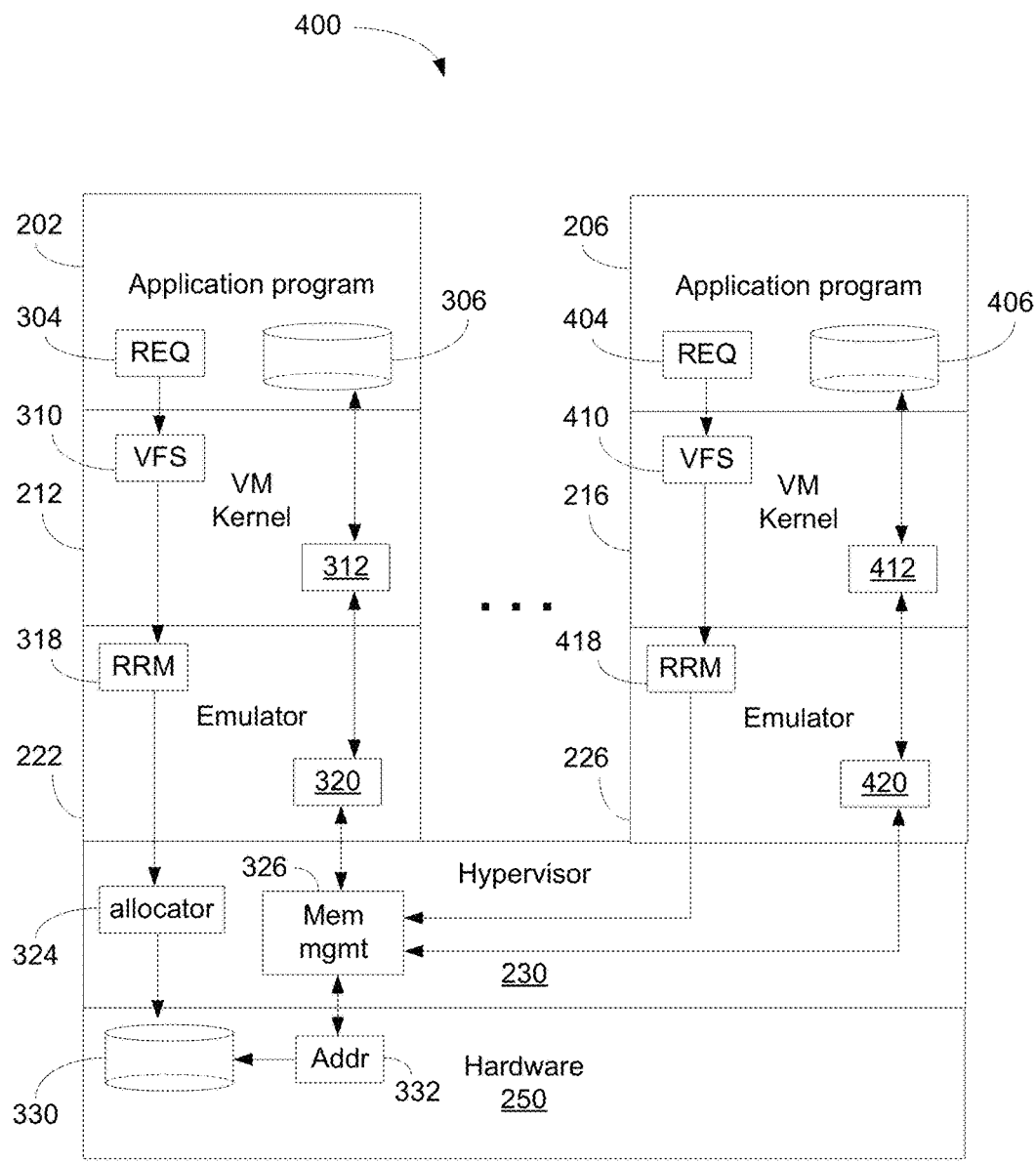
FIG. 4 is a block diagram illustrating a VM network device capable of transferring a state of one VM to another VM in accordance with one embodiment of the present invention.

FIG. 4 is a block diagram illustrating a VM network device 400 capable of transferring a state of one VM to another VM in accordance with one embodiment of the present invention. Device 400, similar to device 300 illustrated in FIG. 3, includes a hardware layer 250, a hypervisor layer 230, emulators 222-226, VM kernels 212-216, and application programs 202-206 which are running on top of VM kernels. To provide a VM environment, device 400, in one embodiment, employs a VIMFS to control, redistribute, and access the finite hardware resource such as memory resources. It should be noted that the underlying concept of the exemplary embodiment(s) of the present invention would not change if one or more layers (or sub-layers) were added to or removed from diagram 400.

During a device maintenance procedure such as software upgrade, device 400 determines that a new VM is needed to maintain the current routing while allowing the current VM to be upgraded. Application program 206 is activated to be the new VM and it takes over the routing tasks while application program 202 is being upgraded. To establish a new VM such as application 206 having the same states and data as the old VM such as application 202, application 206 needs to have the exact copy of the data, states, and/or context of application 202.

To obtain the exact current states, data, and/or context, VIMFS allows application program 206 to request for accessing physical memory 330 which should contain the current states, data, and context of application program 202. When request 404 reaches VFS module 410 in VM kernel 216, module 410 forwards request 404 to emulator 226 instead of trying to allocate the memory. Upon receipt of request 404 from RRM 418, hypervisor 230 allows memory manager 326 to provide memory address 332 to application program 206. After returning of address 332 to local application memory 406 via emulator transparent memory 420 and VM kernel transparent memory 412, the contents stored at physical memory 330 pointed by address 332 becomes visible to application program 206. As such, the state of application program 202 is effectively transferred to application program 206.

Figure 5:
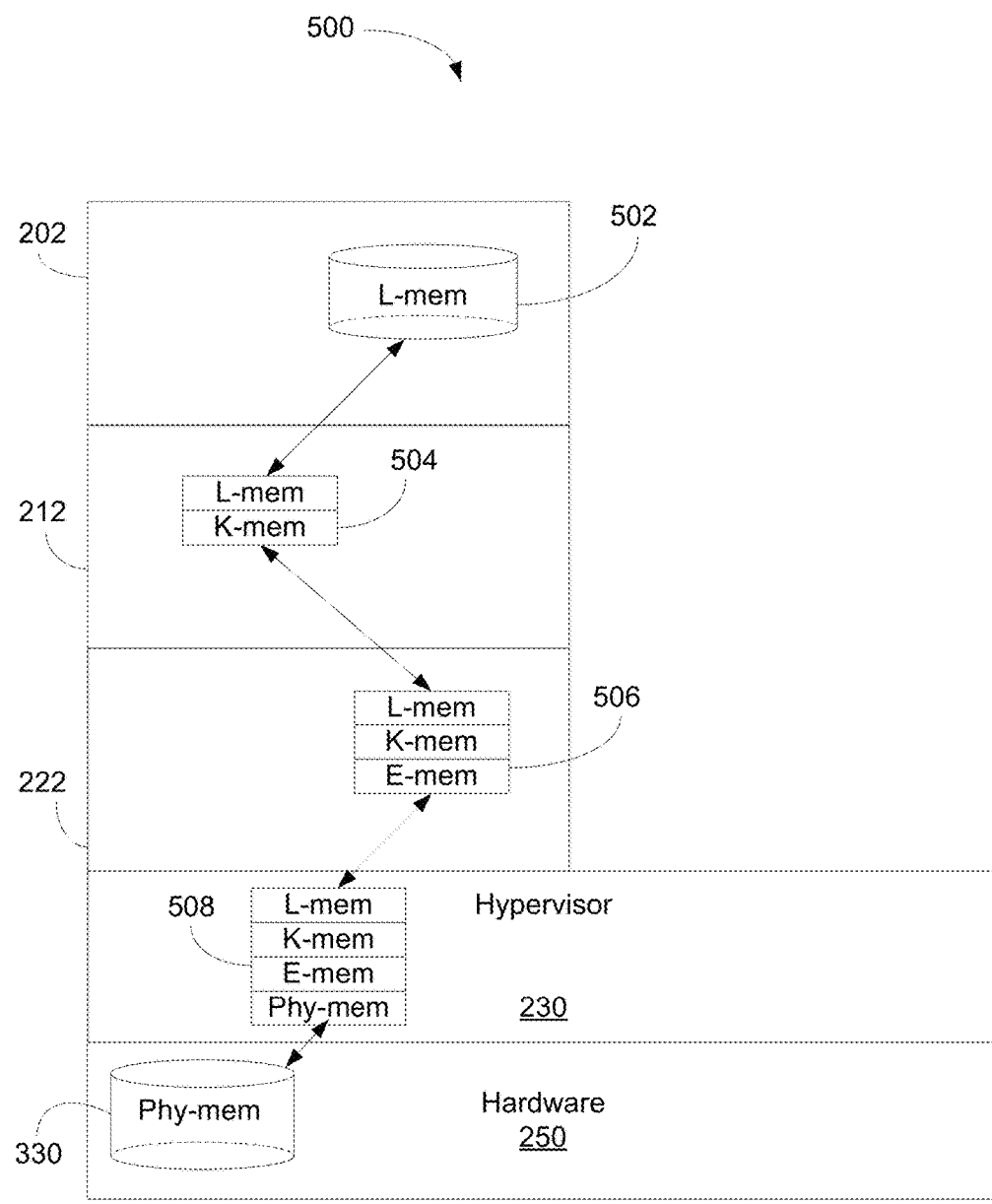
FIG. 5 is a block diagram 500 illustrating memory management using multiple in-memory databases in the virtualized IMFS in accordance with one embodiment of the present invention.

FIG. 5 is a block diagram 500 illustrating a VIMFS process of memory management using multiple databases or tables to track memory allocations in connection to IMFS in accordance with one embodiment of the present invention. Diagram 500 includes a hardware layer 250, a hypervisor layer 230, emulator 222, VM kernel 212, and application program 202 which is running on top of VM kernel 212. To provide a VM environment, the device, in one embodiment, employs a VIMFS to control, redistribute, and manage the finite hardware resource such as memory space.

After memory allocation, local memory ("L-mem") 502 becomes visible to application program 202. L-mem 502 can also be referred to as local application memory allowing application program 202 to store and/or retrieve data to and from L-mem 502. Kernel 212, in one embodiment, includes a table 504 containing a kernel memory address ("K-mem") which is used to reference and/or associate with L-mem.

Similarly, emulator 222 has a table 506 containing an emulator memory address ("E-mem") which is associated with K-mem and L-mem. Hypervisor 230 also includes a table 508 which contains a physical memory address ("Phy-mem") and it is associated with E-mem, K-mem, and L-mem. The Phy-mem addresses physical memory 330.

During an operation, if application program 202, kernel 212, and/or emulator 222 is unexpectedly terminated or down, hypervisor 230 is able to maintain the data and states associated with the down or failed application, kernel, or emulator in physical memory 330 and table 508, and subsequently restores the last state(s) after application program 202, kernel 212, and/or emulator 222 recovers. Since IMFS can survive the termination of a program, kernel, and/or emulator, the state and/or context can be restored by hypervisor 230 using table 508 or the like.

The exemplary aspect of the present invention includes various processing steps, which will be described below. The steps of the aspect may be embodied in machine, router, or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
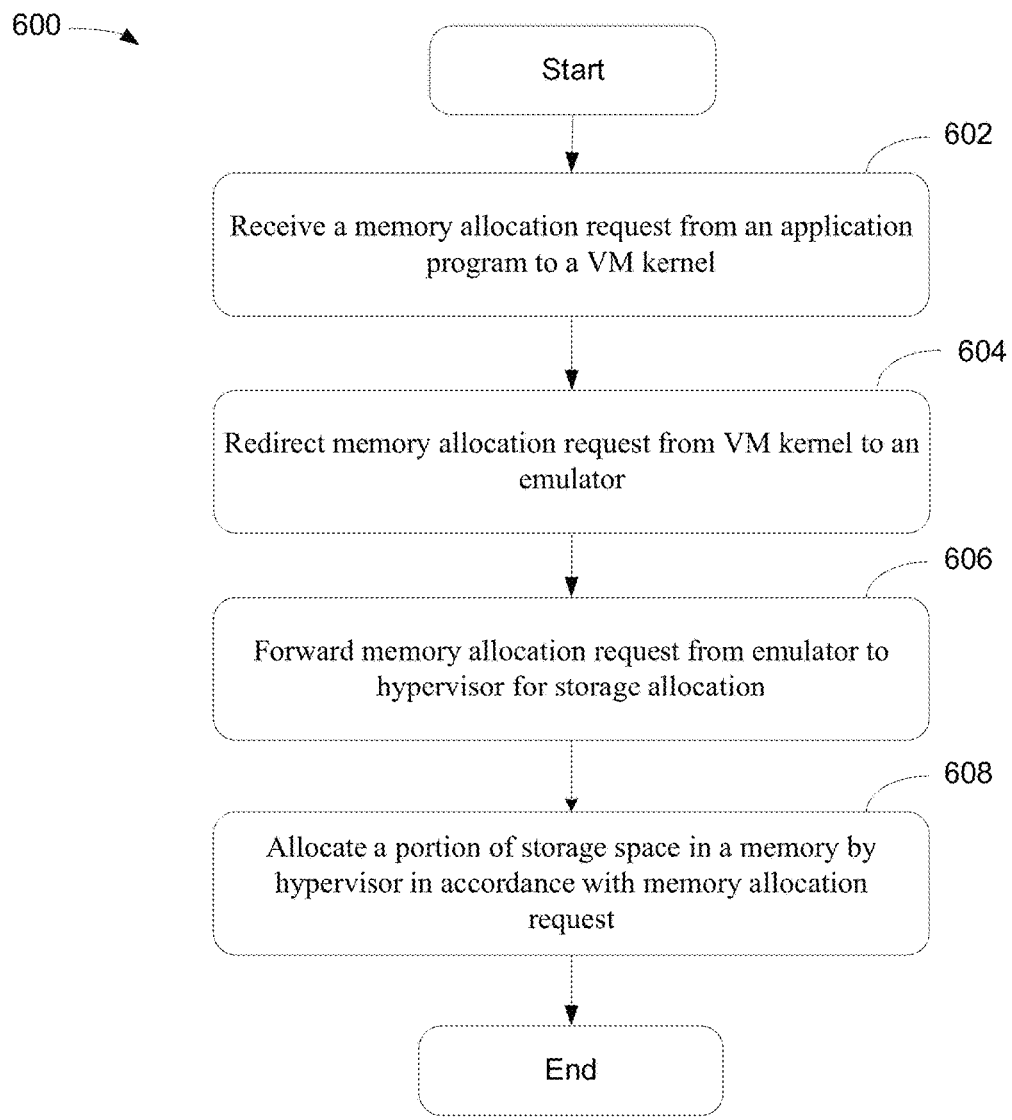
FIGS. 6-7 are flowcharts illustrating exemplary processes of memory allocation via virtualized IMFS in a VM environment in accordance with one embodiment of the present invention.

FIG. 6 is a flowchart illustrating an exemplary process of allocating memory space via IMFS in accordance with one embodiment of the present invention. At block 602, a process of allocating hardware resource for a network system in a VM environment receives a memory allocation request sent from an application program to a VM kernel.

At block 604, instead of executing the request, the kernel redirects the request to an emulator which operates between the abstraction layer of the VM kernel and the abstraction layer of hypervisor emulating and supporting VMs. At block 606, upon receipt of the request, the emulator again forwards the request to the hypervisor for execution.

At block 608, a portion of storage space is allocated in a memory or physical memory disk organized in the IMFS configuration by the hypervisor according to the request. In one example, after execution of memory allocation, a result memory addresses or result codes associated with the allocated storage space is returned to the emulator. After receipt of the result memory addresses, the emulator passes the result memory addresses to the VFS module in the VM kernel. When the result memory addresses are forwarded to the application program, the application memory addressed by the result memory addresses becomes visible to the application program whereby it can store and/or retrieve information to and from the portion of allocated storage space as its local in-memory file storage.

In one aspect, the hypervisor creates a persistent storage area utilizing memory backed file system or IMFS. To access file system, the hypervisor can activate system commands such as Linux® tmpfs or ramfs to establish in-memory file system. The data stored in the portion of storage space is maintained by the hypervisor when the application program is crashed. Alternatively, the information stored in the portion of storage space is kept or maintained by the hypervisor for a predefined period of time when the emulator is down. It should be noted that the predefined period of time may be set during the system initialization or provisioning process.

Figure 7:
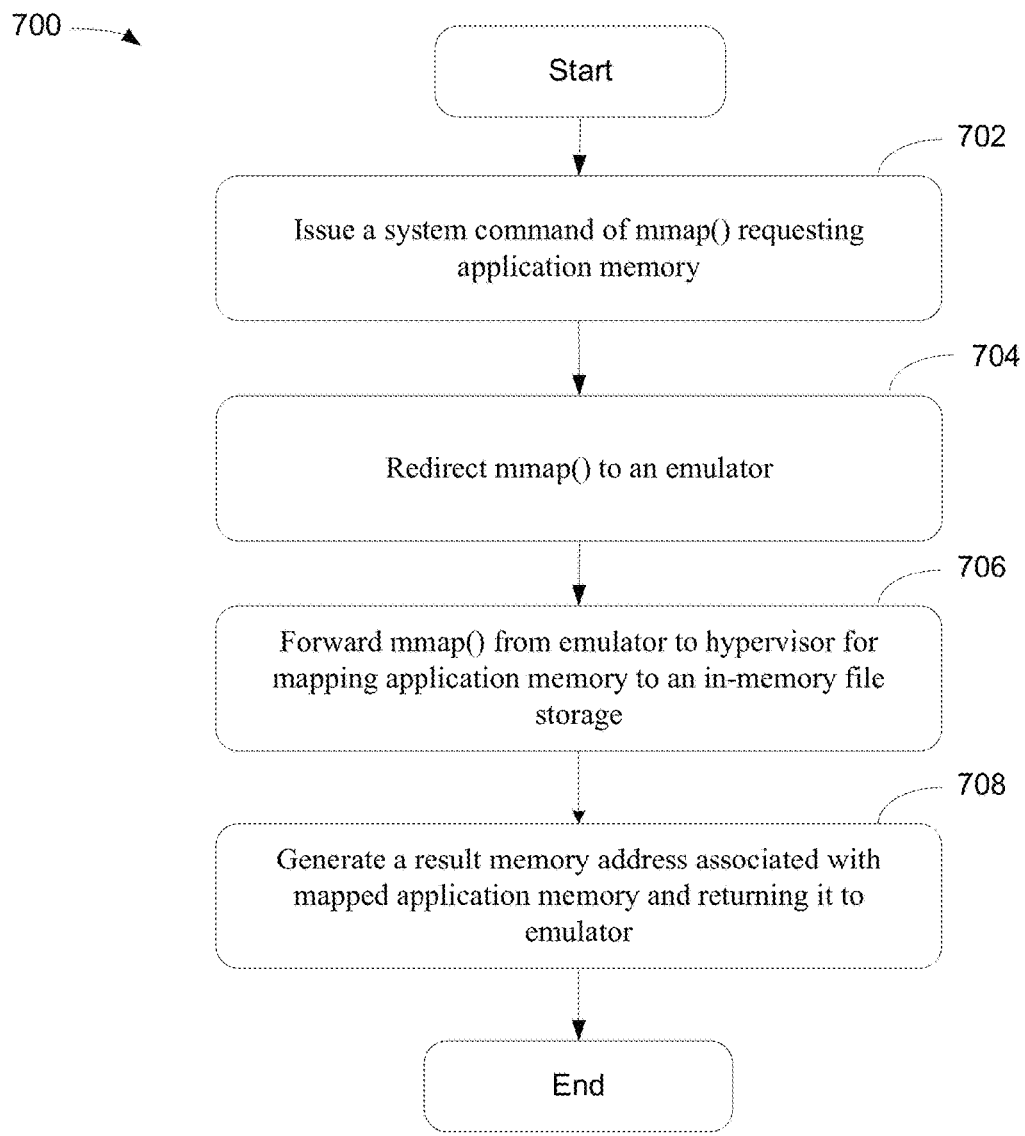

FIG. 7 is a flowchart illustrating an exemplary process of handling a system command via IMFS using virtualization technology in accordance with one embodiment of the present. At block 702, a process for memory allocation in a VM environment issues a system command requesting application memory mapping for a VM by a VM kernel relating to memory access by an application program. In one aspect, the system command is mmap( ) which is a UNIX system call for memory mapping.

At block 704, after redirecting the system command from a VM kernel to an emulator, mmap( ), at block 706, is again forwarded to hypervisor for mapping application memory to an in-memory file storage. At block 708, a result memory address which is associated with mapped application memory is generated. The result memory address is subsequently retuned to emulator. After attaching the result memory address to the VM for memory visibility, the result memory address is inserted in the VM kernel for memory access. The process, in one embodiment, is capable of allowing the application program to use the result memory address to access the in-memory storage located and managed by the hypervisor.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for allocating resource for a virtual machine ("VM") in a network system, comprising:
   receiving an initial request for memory allocation sent from a first application program to a first VM kernel controlling the first application program;
   redirecting the initial request from the first VM kernel to an emulator which operates in an abstraction layer situated between the first VM kernel and hypervisor for emulating a VM environment;
   forwarding the initial request from the emulator to the hypervisor situated between the emulator and hardware for storage allocation;
   allocating a portion of storage space in an in-memory file system ("IMFS") in the hardware by the hypervisor in accordance with the initial request by:
      executing the memory allocation request and returning a memory addresses associated with the portion of storage space indicating a memory mapped location to the emulator;
      passing the memory address from the emulator to a virtual file system ("VFS") module in the VM kernel;
      forwarding the memory address from the VFS module to the first application program and allowing the first application program to access the portion of storage space as its local memory mapped in IMFS;
   presenting the portion of storage space in the IMFS by the hypervisor to a second application program for memory access via a second VM kernel; and
   maintaining the portion of storage space by the hypervisor when the first application program is terminated.

2. The method of claim 1, further comprising facilitating hypervisor to create a persistent storage area utilizing memory backed file system.

3. The method of claim 2, wherein facilitating hypervisor to create a persistent storage area utilizing memory backed file system includes activating Linux tmpfs or ramfs to establish application memories within the IMFS.

4. A method for allocating resource for a virtual machine ("VM") in a network system, comprising:
receiving an initial request for memory allocation sent from a first application program to a first VM kernel controlling the first application program;
redirecting the initial request from the first VM kernel to an emulator which operates in an abstraction layer situated between the first VM kernel and hypervisor for emulating a VM environment;
forwarding the initial request from the emulator to the hypervisor situated between the emulator and hardware for storage allocation;
allocating a portion of storage space in an in-memory file system ("IMFS") in the hardware by the hypervisor in accordance with the initial request by:
executing the memory allocation request and returning a memory addresses associated with the portion of storage space indicating a memory mapped location to the emulator;
passing the memory address from the emulator to a virtual file system ("VFS") module in the VM kernel;
forwarding the memory address from the VFS module to the application program and allowing the application program to access the portion of storage space as its local memory mapped in IMFS;
presenting the portion of storage space in the IMFS by the hypervisor to a second application program for memory access via a second VM kernel; and
maintaining the portion of storage space by the hypervisor for a predefined period of time when the emulator is down.

5. The method of claim 4, further comprising facilitating hypervisor to create a persistent storage area utilizing memory backed file system.

6. The method of claim 5, wherein facilitating hypervisor to create a persistent storage area utilizing memory backed file system includes activating Linux tmpfs or ramfs to establish application memories within the IMFS.

7. A network apparatus able to provide a virtual machine ("VM") environment, the network apparatus containing a microprocessor and memory, and configured to couple to a communications network, comprising:
a virtualized in-memory file system ("VIMFS") configured to control access of hardware resource and pass a memory allocation request from kernel to emulator;
a plurality of emulators running on top of VIMFS and operable to support multiple operating systems running concurrently;
a plurality of VM kernels running over at least a portion of the plurality of emulators able to manage and distribute system resources as operating systems for a plurality of VMs;
a plurality of application programs running within control of at least a portion of the plurality of kernels configured to access in-memory file storage ("IMFS") which is managed and controlled by the VIMFS; and
a hypervisor coupled to the hardware resource and configured to facilitate presenting a portion of storage space in the IMFS assigned to a first application program running over a first VM to a second application program running over a second VM,
wherein the VIMFS is configured to generate a memory addresses associated with the portion of storage space indicating a memory mapped location to the emulator in accordance with the memory allocation request and pass the memory address from the emulator to a virtual file system ("VFS") module, the VFS module configured to forward the memory address to the application program for accessing the portion of storage space as its local memory mapped in IMFS, wherein the hypervisor maintains the portion of storage space when the first application program is terminated.

8. The network apparatus of claim 7, wherein the VIMFS is hypervisor configured to create persistent storage areas for multiple VMs to access in-memory file systems.

9. The network apparatus of claim 8, wherein each of the plurality of VM kernels includes a virtual file system ("VFS") module configured to redirect a storage request from the application program to one of the plurality of emulators.

10. The network apparatus of claim 9, wherein each of the plurality of emulators includes a request redirect module configured to forward the storage request to the hypervisor.

11. The network apparatus of claim 8, the hypervisor maintains program execution state for a predefined period of time after the application program or entire VM terminates.

12. The network apparatus of claim 8, the hypervisor maintains VM context for a predefined period of time after the associated emulator is down.

13. The network apparatus of claim 8, the hypervisor is configured to transfer context of a first VM stored in IMFS to a second VM for facilitating in-service software upgrade.

14. The network apparatus of claim 7, wherein the hypervisor is able to present allocated storage in the IMFS to the application program in the VM as its local memory and allows the application program to implement memory-mapped filed system to the allocated storage.

15. A method for memory allocation for a virtual machine ("VM") of a network system, comprising:
issuing a first system command requesting application memory mapping for the first VM by a first VM kernel in response to a memory access by a first application program;
redirecting the first system command to an emulator emulating a VM environment between an abstraction of the first VM kernel and an abstraction of hypervisor situated between the emulator and hardware;
forwarding the first system command from the emulator to hypervisor for mapping application memory to an in-memory file storage ("IMFS") in the hardware in response to the first system command;
generating a result memory address associated with mapped application memory and returning the result memory address to the emulator;
allowing the first application program to access a portion of storage space as its local memory mapped in IMFS via the result memory address received from a virtual file system ("VFS") module in the first VM kernel;
presenting the application memory in the IMFS by the hypervisor to a second application program for memory access via a second VM; and
maintaining the portion of storage space by the hypervisor for a predefined period of time when the emulator is down.

16. The method of claim 15, wherein issuing a system command requesting application memory mapping for the VM includes providing mmap( ) system command.

17. The method of claim 16, further comprising:
attaching the result memory address to the first VM for memory visibility;
inserting the result memory address to the first VM kernel for memory access; and
allowing the first application program utilizing the result memory address to access the in-memory storage located in the hypervisor.

* * * * *